(12) United States Patent
Feng et al.

(10) Patent No.: US 7,609,954 B2
(45) Date of Patent: Oct. 27, 2009

(54) LENS MODULE AND CAMERA MODULE USING THE LENS MODULE

(75) Inventors: Chen Feng, Snohomish, WA (US); Ming Lee, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 256 days.

(21) Appl. No.: 11/681,619

(22) Filed: Mar. 2, 2007

(65) Prior Publication Data

US 2008/0080847 A1  Apr. 3, 2008

(30) Foreign Application Priority Data

Sep. 29, 2006  (CN) .................... 2006 1 0062905

(51) Int. Cl.
*G03B 17/00* (2006.01)
(52) U.S. Cl. .................. 396/72; 359/245; 359/666; 349/200
(58) Field of Classification Search .............. 396/72, 396/79, 89; 348/240.3; 349/200; 359/665–667, 359/228
See application file for complete search history.

(56) References Cited

U.S. PATENT DOCUMENTS 5,144,603 A * 9/1992 Mozume et al. .......... 369/44.14

| | | | | |
|---|---|---|---|---|
| 6,191,881 B1 * | 2/2001 | Tajima | ....................... | 359/254 |
| 6,359,674 B1 * | 3/2002 | Horiuchi | ..................... | 349/200 |
| 2004/0223113 A1 * | 11/2004 | Blum et al. | ................. | 349/200 |
| 2006/0164593 A1 * | 7/2006 | Peyghambarian et al. | ... | 349/200 |
| 2007/0058070 A1 * | 3/2007 | Chen | ......................... | 348/340 |
| 2008/0002139 A1 * | 1/2008 | Hashimoto | .................. | 349/187 |

FOREIGN PATENT DOCUMENTS

| CN | 1367398 A | 9/2002 |
|---|---|---|
| CN | 1702467 A | 11/2005 |
| WO | WO2005/076069 A1 | 8/2005 |

* cited by examiner

*Primary Examiner*—W B Perkey
*Assistant Examiner*—Noam Reisner
(74) *Attorney, Agent, or Firm*—Steven M. Reiss

(57) ABSTRACT

A lens module includes a lens barrel, at least one fixed focus lens fixed in the lens barrel, and at least two variable focus lenses fixed in the lens barrel. Each variable focus lens includes two electrodes and an electro-optical material between the electrodes. Each electrode is electrically connected to a voltage supply so as to be able to selectively apply a voltage to the electro-optical material and to thus selectively control the refractive index of that material. By changing the refractive index, a concordant change in the focus of a given variable focus lens is possible, without modifying the position and/or shape thereof.

15 Claims, 6 Drawing Sheets

LENS MODULE AND CAMERA MODULE USING THE LENS MODULE

BACKGROUND OF THE INVENTION

1. Field of the Invention

The present invention relates generally to lens modules and, more particularly, to a lens module having a variable focus and to a camera module using the lens module.

2. Description of related art

With the development of wireless communication technologies, increasing numbers of mobile phones and PDAs now include digital cameras as a special feature.

Generally speaking, digital cameras are image-recording media capable of photographing images without using film. Such a digital camera typically uses an image pickup device, which is a kind of semiconductor device, such as a charged coupled device (CCD) or complementary metal oxide semiconductor (CMOS). In the digital camera, an object image formed on the image pickup device through a lens is converted into an electronic signal by the image pickup device, and the electrical signal is stored as a digital signal, for example, either in the camera unit or in a mobile phone or PDA in which the digital camera is mounted.

Since the digital camera is to be mounted in a small mobile phone or PDA, a fixed focus lens module is usually used to facilitate mounting thereof. However, images photographed by a digital camera module with a fixed focus lens module tend to be of poor quality. This poor quality is partly due to the fixed focus lens system, which is incapable of adjusting a distance between the lens(es) and the image pickup device and/or between the lenses themselves to make a clearer image when photographing objects at different distances from the camera. Thus, a focusing structure or a zoom structure is required to change the focus of the digital camera module.

A typical driving apparatus uses a gear or cam mechanism to realize the focusing or zoom function. This structure is relatively large and makes the camera structure fairly complicated. Furthermore, the operation of the mechanical structure consumes a substantial amount of energy, which is of concern given the limited battery capacity of the portable device with which it is associated. In addition, the precision of the mechanical transmission is not high.

Therefore, a new lens module is desired in order to overcome the above-described shortcomings.

SUMMARY OF THE INVENTION

In one embodiment thereof, a lens module is provided. The lens module includes a lens barrel, at least one fixed focus lens fixed in the lens barrel, and at least two variable focus lenses fixed in the lens barrel. Each variable focus lens includes two electrodes and an electro-optical material filled between the electrodes. Each electrode is electrically connected to a voltage supply so as to apply a voltage to the electro-optical material.

Other advantages and novel features will become more apparent from the following detailed description of preferred embodiments when taken in conjunction with the accompanying drawings.

BRIEF DESCRIPTION OF THE DRAWINGS

Many aspects of the lens module can be better understood with reference to the following drawings. The components in the drawings are not necessarily drawn to scale, the emphasis instead being placed upon clearly illustrating the principles of the lens module. Moreover, in the drawings like reference numerals designate corresponding parts throughout the several views.

DETAILED DESCRIPTION OF THE INVENTION

Figure 1:
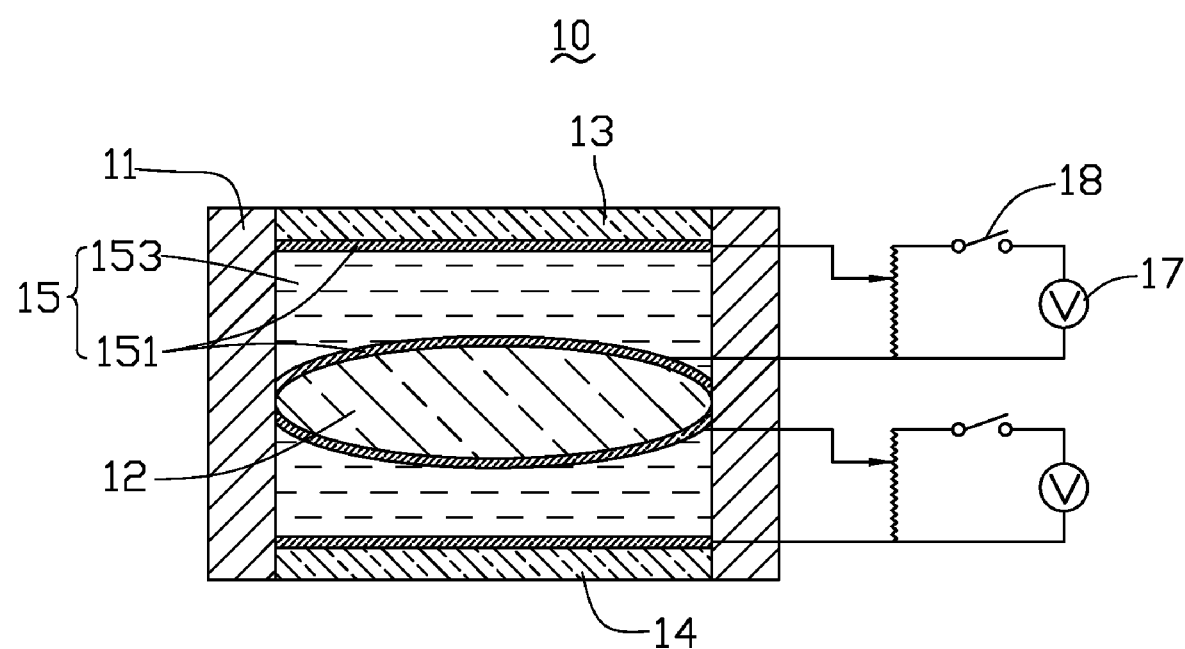
FIG. 1 is a cut-away view of a first embodiment of a lens module.

Referring to FIG. 1, in a first preferred embodiment, a lens module 10 includes a barrel 11, a fixed focus lens 12, a front sealing cover 13, a rear sealing cover 14, and two variable focus lenses 15.

The fixed focus lens 12 may be a spherical convex lens or a spherical concave lens and may be made of glass or plastic, with a fixed refractive index. The fixed focus lens 12 is received in the barrel 11.

The front sealing cover 13 and the rear sealing cover 14 may be made, e.g., of glass or plastic and may be any optically-appropriate shape, such as a dome window or a planar plate. Advantageously, the front sealing cover 13 may be a protective window for the lens module 10, and the rear sealing cover 14 may be an infrared-cut filter. The front sealing cover 13 is fixed in a first end of the barrel 11, and the rear sealing cover 14 is fixed in a second end of the barrel 11. Thus, a first sealed space may be defined between the front sealing cover 13 and the fixed focus lens 12, and a second sealed space may be defined between the rear sealing cover 14 and the fixed focus lens 12.

Each variable focus lens 15 includes a pair of transparent electrodes 151 and an electro-optical material 153 filled between the two transparent electrodes 151. The electro-optical material 153 may, for example, be chosen from the group including lithium niobate, gallium arsenide, lithium tantalite, and liquid crystal material. A refractive index of the electro-optical material 153 may vary with a variable voltage applied by the electrodes 151, and, thus, a focal length of the variable focus lens 15 may also vary with the variable voltage.

The transparent electrodes 151 can, for example, be indium tin oxide conductive films and are respectively coated on two side surfaces of the fixed focus lens 12, on an inside surface of the front cover 13, and on an inside surface of the rear sealing cover 14. Each pair of transparent electrodes is electrically connected to a variable voltage supply 17 controlled by a switch 18. Thus, a variable voltage can be applied to the electro-optical material 153. An adjustment of the voltage results in a change in the refractive index of the electro-optical material 153, and, as such, the electro-optical material 153 is effectively able to operate as an adjustable/variable lens without having to undergo a position and/or shape change.

Figure 2:
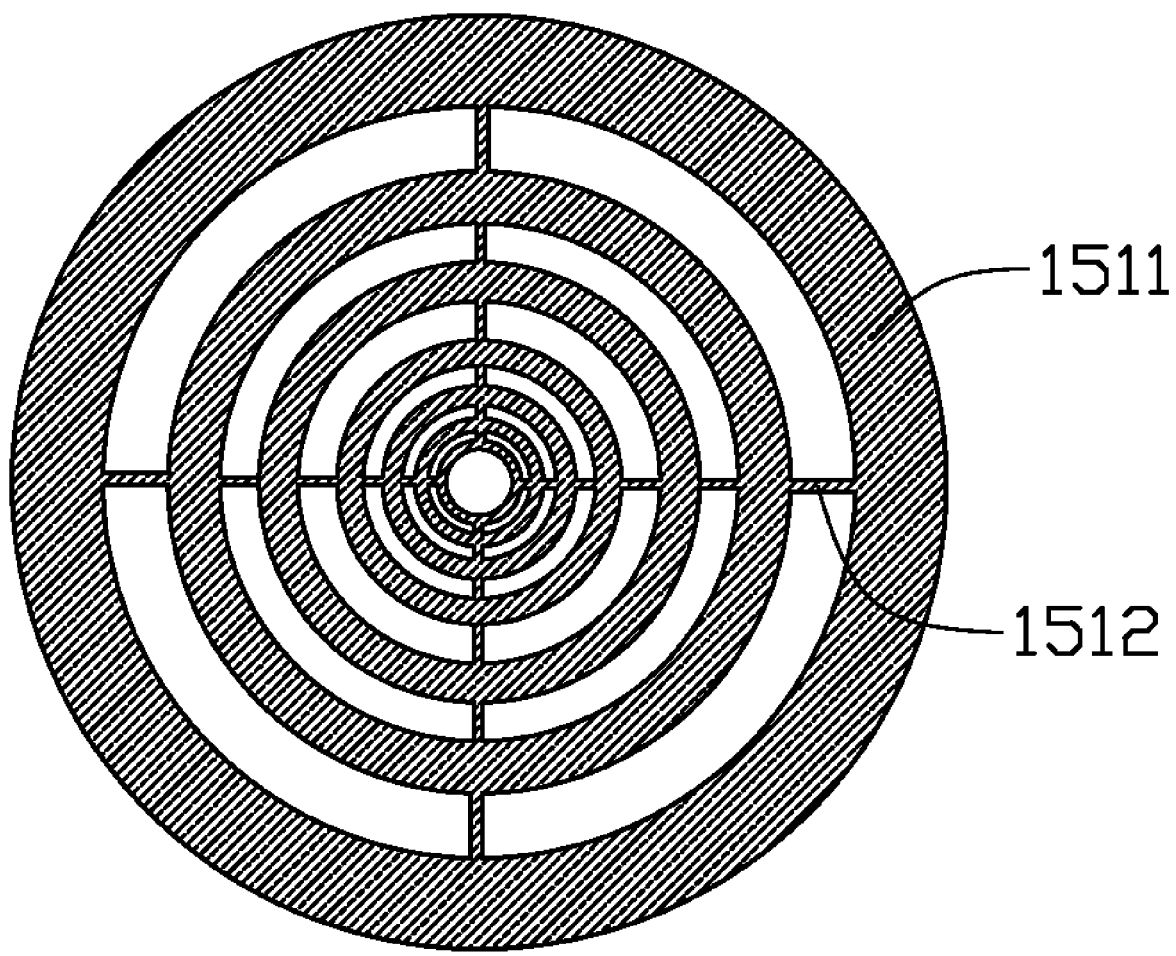
FIG. 2 is a top view of a first embodiment of an electrode of the lens module in FIG. 1.
Figure 3:
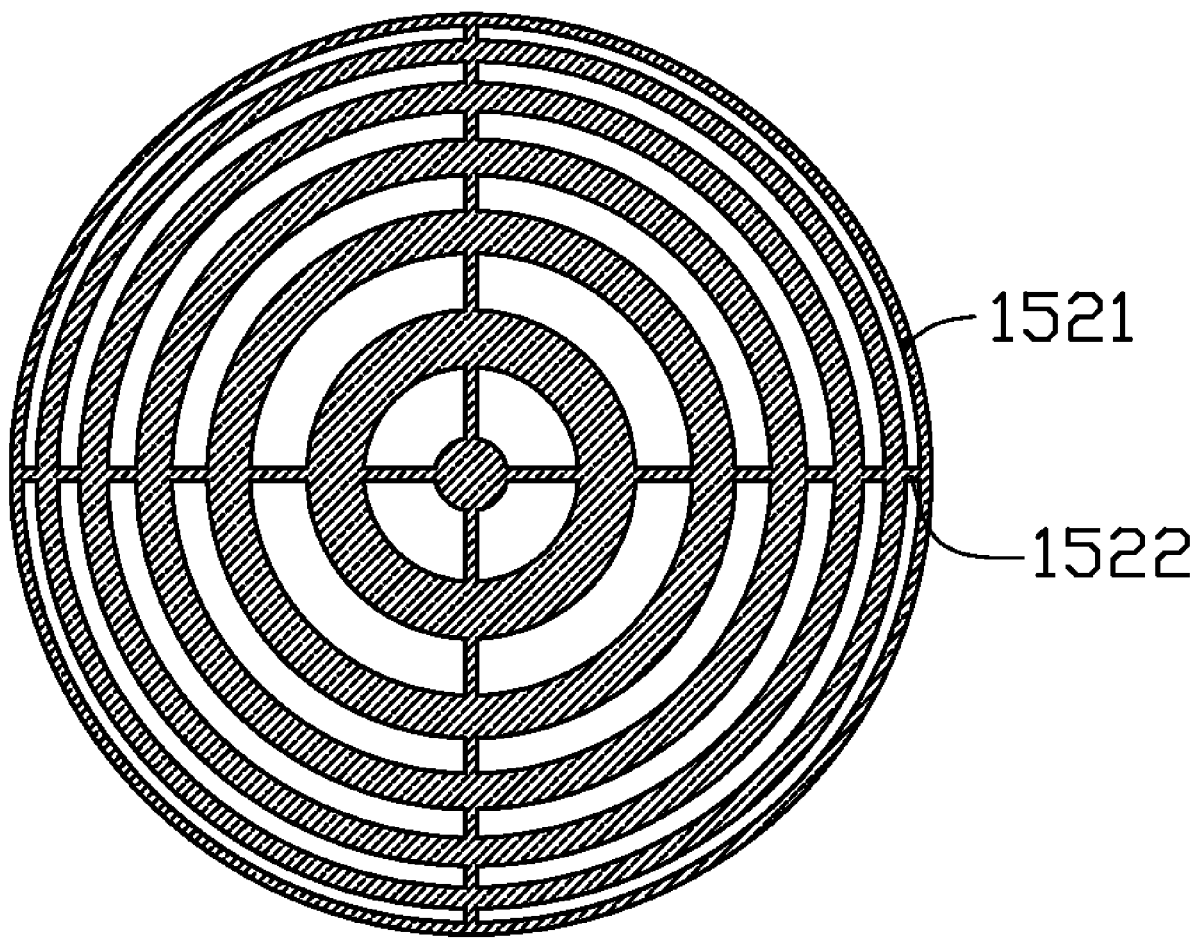
FIG. 3 is a top-down view of a second embodiment of an electrode of the lens module in FIG. 1.

Referring to FIG. 2, each of the electrodes 151 can be designed as a configuration including a plurality of spaced annular rings 1511 with varying radiuses and/or widths. The annular rings 1511 are arranged to be concentric with each other. Beneficially, the widths of the rings 1511 decrease, respectively, as the radiuses of the rings 1511 decrease, and ring spaces between neighboring rings decreases as the center thereof is approached. The rings 1511 are connected with very thin spoke connections 1512, which will not introduce any significant additional electrical field due to the widths of the spoke connections 1512 being thin enough. Alternatively, referring to FIG. 3, each of the electrodes 151 can instead be designed so that the widths of the rings 1511 increase as the radius of the rings 1511 decreases, and the ring spaces increase also, as the ring center is approached.

One of the variable focus lenses 15 is received in the first sealed space defined by the front sealing cover 13 and the fixed focus lens 12, with two corresponding electrodes 151 being formed on a surface of the front sealing cover 13 and a surface of the fixed focus lens 12. Another one of the variable focus lenses 15 is received in the second sealed space defined by the rear sealing cover 14 and the fixed focus lens 12, with two corresponding electrodes 151 being formed on a surface of the rear sealing cover 14 and a surface of the fixed focus lens 12.

When the voltage supply 17 applies a voltage to the electrodes 151 of one of the variable focus lenses 15, an electric field may be formed between the electrodes 151 to change the focal length of the corresponding one of the variable focus lenses 15. The electric field formed between electrodes 151 can be modified according to modifications of the ring spaces and ring widths.

It should be understood that the lens module 10 further includes a servo system (not shown in FIGS) for automatically controlling the switch 18. Thus, a four-position auto focus of the lens module 10 can be achieved with each switch 18 being selectively switched on or off. The focal lengths of the lens modules 10 also can be continuously/selectively modified with continuous/selective change of the voltage applied to the electrodes 151 (i.e., a variance in the applied voltage will result in change in the effective focal length, in addition to a change in on/off status).

Figure 4:
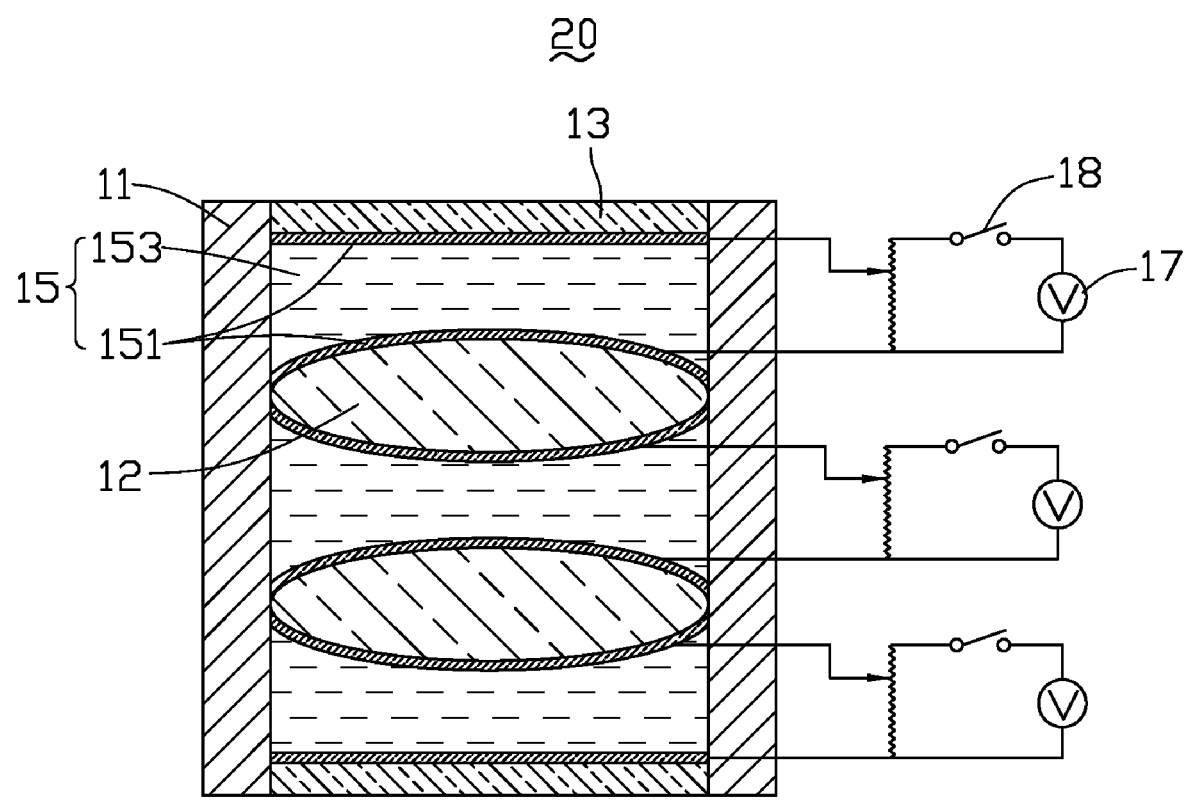
FIG. 4 is a cut-away view of a second embodiment of a lens module.

In a second embodiment, as shown in FIG. 4, a lens module 20 includes two fixed focus lenses 12 and three variable focus lenses 15 received in the barrel 11. Thus, eight-position auto focus of the lens module 10 can be achieved with each switch 18 being selectively switched on or off.

Figure 5:
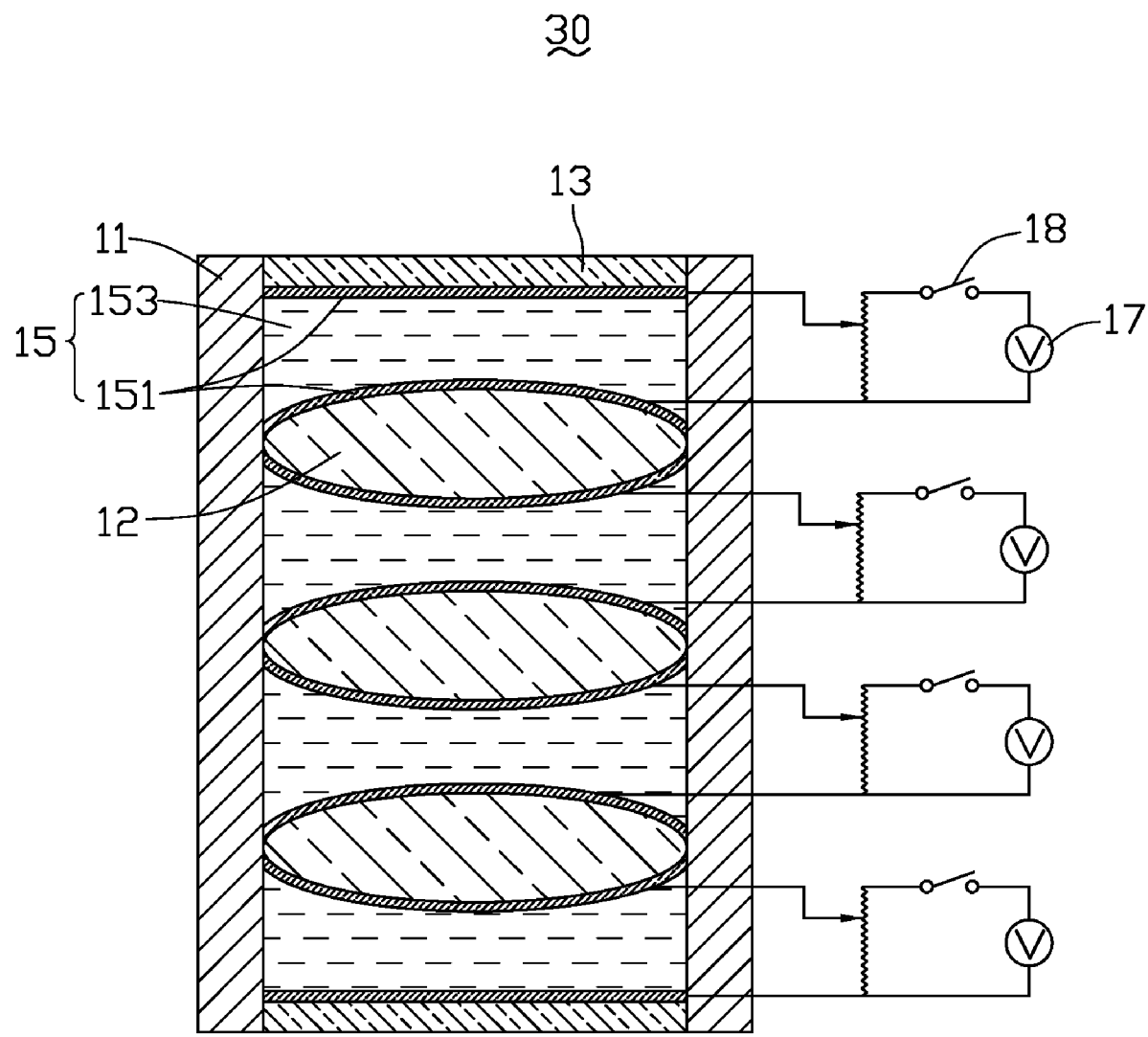
FIG. 5 is a cut-away view of a third embodiment of a lens module.

In yet a third embodiment, as shown in FIG. 5, a lens module 30 includes three fixed focus lenses 12 and four variable focus lenses 15 received in the barrel 11. Thus, sixteen-position auto focus of the lens module 10 can be achieved with each switch 18 being selectively switched on or off.

Figure 6:
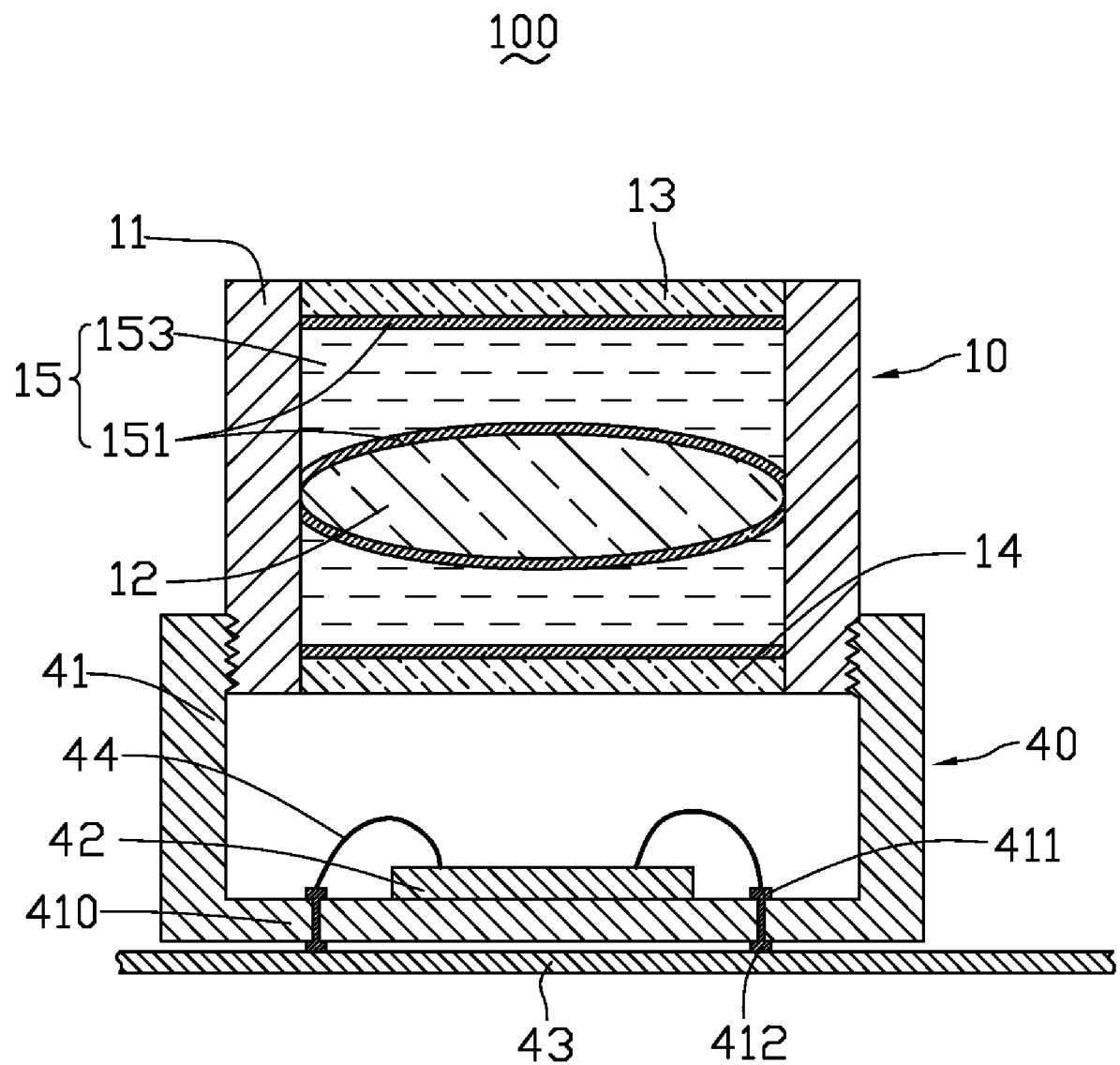
FIG. 6 shows a digital camera module, using the lens module shown in FIG. 1.

Referring to FIG. 6, a digital camera module 100 includes the lens module 10 and an image module 40. The image module 40 includes a carrier member 41, a image-receiving chip 42, a printed circuit board 43, and a plurality of connective wires 44.

The carrier member 41 is made of a material such as a plastic, a ceramic, or a fibrous composite. The carrier member 41 has a base plate 410. The base plate 410 has a plurality of top pads 411 formed on a top surface thereof and a plurality of bottom pads 412 formed on a bottom surface thereof. Each of the top pads 411 is electronically connected to a corresponding one of the bottom pads 412. The image-receiving chip 42 is mounted on the base plate 410 and electronically connected to top pads 411 via the connective wires 44. The printed circuit board 43 is disposed under the base plate 410 and electronically connected to bottom pads 412, thereby allowing the image-receiving chip 42 being electronically linked to the printed circuit board 43.

The lens module 10 is fixed to the carrier member 41 of the image module 40 such that a light signal formed by the lens module 10 can be received by the image-receiving chip 42. The light signal may be converted into an electrical signal via the image-receiving chip 42. The electrical signal is then processed by the printed circuit board 43 to obtain an image date.

It should be understood that the lens module 10 associated with the image module 40 can also instead be the lens module 20, the lens module 30, or other lens structures similar thereto, consistent with the scope of the present lens module.

A main advantage is that, due to the limitation of the refractive index change of the electro-optical material 153, multiple variable focus lenses will achieve the desired range of focus and permit compensation of any potential image aberration.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module, comprising:
   a barrel;
   at least one fixed focus lens received in the lens barrel; and
   at least two variable focus lenses fixed in the lens barrel, each variable focus lens including two electrodes and an electro-optical material filled between the respective electrodes, each electrode being electrically connected to a voltage supply and thereby configured for applying a voltage to the electro-optical material;
   wherein each electrode includes a plurality of spaced concentric annular rings with varying radiuses and widths, the widths of the rings decrease as the radius of the rings decrease, and ring spaces between every two neighboring rings decrease in the direction of radius decrease.

2. The lens module as claimed in claim 1, wherein the fixed focus lens is a spherical convex lens or a spherical concave lens.

3. The lens module as claimed in claim 1, wherein the fixed focus lens is made of glass or plastic.

4. The lens module as claimed in claim 1, wherein each of the electrodes is made of an indium tin oxide conductive film.

5. The lens module as claimed in claim 1, wherein the rings are connected with thin spoke connections.

6. The lens module as claimed in claim 1, wherein the electro-optical material is chosen from the group including lithium niobate, gallium arsenide, lithium tantalite, and liquid crystal material.

7. The lens module as claimed in claim 1, wherein the lens module further includes a front sealing cover and a rear sealing cover, the front sealing cover being fixed in the a first end of the barrel, the rear sealing cover being fixed in a second end of the barrel.

8. The lens module as claimed in claim 7, wherein the front sealing cover is a protective window for the lens module, and the rear sealing cover is an infrared cut-off filter.

9. The lens module as claimed in claim 7, wherein the electrodes are formed on surfaces of the fixed focus lens, the front sealing cover, and the rear sealing cover.

10. The lens module as claimed in claim 1, further comprising a servo system, wherein the servo system is configured for automatically controlling the voltage applied to the electro-optical material.

11. The lens module as claimed in claim 1, wherein the lens module includes two fixed focus lenses and three variable focus lenses received in the barrel.

12. The lens module as claimed in claim 1, wherein the lens module includes three fixed focus lenses and four variable focus lenses received in the barrel.

13. A camera module, comprising:
an image-receiving element; and
a lens module configured for focusing an image upon the image-receiving element, the lens module comprising:
a barrel;
at least one fixed focus lens received in the lens barrel; and
at least two variable focus lenses fixed in the lens barrel, each variable focus lens including two electrodes and an electro-optical material filled between the respective electrodes, each electrode being electrically connected to a voltage supply and thereby configured for applying a voltage to the electro-optical material;
wherein each electrode includes a plurality of spaced concentric annular rings with varying radiuses and widths, the widths of the rings decrease as the radius of the rings decrease, and ring spaces between every two neighboring rings decrease in the direction of radius decrease.

14. The lens module as claimed in claim 13, wherein the electro-optical material is chosen from the group including lithium niobate, gallium arsenide, lithium tantalite, and liquid crystal material.

15. The lens module as claimed in claim 13, wherein each of the electrodes includes a plurality of spaced concentric annular rings with varying radiuses and widths, the rings are connected with thin spoke connections.

* * * * *